United States Patent
Qiu et al.

(10) Patent No.: US 7,883,754 B2
(45) Date of Patent: Feb. 8, 2011

(54) CASING FOR A WRITING INSTRUMENT AND METHOD OF MANUFACTURING THE SAME USING DUAL INJECTION MOLDING

(75) Inventors: Zhiming Qiu, Ningbo (CN); Bin Lin, Ningbo (CN)

(73) Assignee: Beifa Group Co., Ltd., Ningbo (CN)

( * ) Notice: Subject to any disclaimer, the term of this patent is extended or adjusted under 35 U.S.C. 154(b) by 600 days.

(21) Appl. No.: 11/535,465

(22) Filed: Sep. 26, 2006

(65) Prior Publication Data

US 2007/0077111 A1    Apr. 5, 2007

(30) Foreign Application Priority Data

Sep. 26, 2005    (CN) .................... 2005 1 0106699

(51) Int. Cl.
*B43K 21/06*    (2006.01)
*B43K 24/04*    (2006.01)
*B43K 24/12*    (2006.01)

(52) U.S. Cl. .................... 428/35.7; 428/36.8; 428/36.9; 401/104; 401/99; 401/6; D19/35

(58) Field of Classification Search .................... 401/6, 401/107, 265, 251, 258, 198, 104, 99; 428/35.7, 428/36.8, 36.9; D19/35
See application file for complete search history.

(56) References Cited

U.S. PATENT DOCUMENTS

| | | | |
|---|---|---|---|
| 4,076,427 A * | 2/1978 | Anderson | ...................... 401/6 |
| D446,244 S | 8/2001 | Baudino | |
| D540,384 S | 4/2007 | Qiu | |
| D546,881 S * | 7/2007 | Qiu | ............................. D19/50 |
| 2002/0192006 A1* | 12/2002 | Vial et al. | ...................... 401/6 |
| 2005/0006814 A1* | 1/2005 | Lin | ............................. 264/255 |
| 2006/0045604 A1* | 3/2006 | Fukui et al. | .................... 401/6 |
| 2006/0086620 A1* | 4/2006 | Chase et al. | ................. 205/164 |
| 2008/0031675 A1* | 2/2008 | Rolion et al. | .................. 401/6 |

OTHER PUBLICATIONS

Zhang, Y., "Pen," U.S. Appl. No. 29/282;575, filed Jul. 24, 2007.
Qiu, Z., U.S. Appl. No. 29/238,611, filed Sep. 19, 2005.

* cited by examiner

*Primary Examiner*—Jennifer C McNeil
*Assistant Examiner*—Ellen S Wood
(74) *Attorney, Agent, or Firm*—Christensen O'Connor Johnson Kindness PLLC

(57) ABSTRACT

A casing for a writing instrument comprises an outer shaft, an inner shaft, and a nib. The outer shaft is formed using dual injection molding. An outer surface of the outer shaft includes a raised hard part and a raised soft part. The inner shaft is formed of a thin-wall tube having an upper end and a lower end, the inner shaft being configured for insertion inside the outer shaft. The inner shaft further includes a fastener protruding on its upper end that engages an upper end of the outer shaft. The nib is configured to engage the lower end of the inner shaft to help secure the inner shaft within the outer shaft. The raised hard or soft parts on the outer surface of the outer shaft may include an oblique loop-shaped part, a strip-shaped part, and/or an arc-shaped part.

17 Claims, 7 Drawing Sheets

CASING FOR A WRITING INSTRUMENT AND METHOD OF MANUFACTURING THE SAME USING DUAL INJECTION MOLDING

BACKGROUND

This present application relates to casings for writing instruments and methods of manufacturing the same. All forms of writing instruments are contemplated, including but not limited to pens, such as ball point pens, felt tip pens, highlighters, etc., and pencils, such as mechanical pencils.

To increase comfort for holding a pen, it is known to install a soft section where the pen is held by a user. With the advance of dual-color injection molding technology, dual-colored penholders are known in the pen-making industry. One example of a penholder for a pen is disclosed in Chinese Patent No. 03120811.8 which uses a dual-color-shaping technology to form hard and soft parts and a pen clip, each having its own special position. Nevertheless, improvements are still sought in the industry to increase the comfort and usability of writing instruments.

SUMMARY

This summary is provided to introduce a selection of concepts in a simplified form that are further exemplified by the embodiments described in the Detailed Description. This summary is not intended to specify key features of the claimed subject matter, nor is it intended to be used as an aid in determining the scope of the claimed subject matter.

The technological solutions disclosed in the present application provide a casing for a writing instrument and method of manufacturing the same in which a user's comfort and use of the writing instrument is improved. In addition, a casing for a writing instrument as disclosed herein can conform to different people's habits of holding and squeezing the writing instrument. As a result, one's finger is not tired easily when writing.

The technological scheme adopted by this invention to solve the aforesaid problems is as follows:

In one aspect, the present application describes a casing for a writing instrument, comprising:
  an outer shaft formed using dual injection molding, wherein an outer surface of the outer shaft includes a raised hard part formed of a hard material and a raised soft part formed of a material that is softer than the hard material;
  an inner shaft formed of a thin-wall tube having an upper end and a lower end, the inner shaft being configured for insertion inside the outer shaft and including a fastener protruding on its upper end that engages an upper end of the outer shaft; and
  a nib configured to engage the lower end of the inner shaft.

To relieve fatigue on one's finger when writing, the cross section of the outer shaft can be designed roughly as a triangle, with an arc that transitions between each respective angle of the triangle.

In arranging the raised hard part and soft part on the outer shaft, one of the soft or hard parts can be configured as a basic part for holding the writing instrument, while the other of the soft or hard parts can be configured to surround the basic hard or soft part.

The surface of the outer shaft may include an oblique loop-shaped hard or soft part that divides the outer shaft into two sections, namely an upper section and a lower section. The upper section of the outer shaft may include one or more strip-shaped hard or soft parts disposed on the surface of the outer shaft. The strip-shaped parts may be distributed symmetrically on the outer shaft. The lower section of outer shaft may include one or more arc-shaped hard or soft parts disposed on the surface of the outer shaft. The arc-shaped parts may be configured to extend laterally from one side to the opposing side of the outer shaft. If desired, characters or patterns can be engraved on the surface of the strip-shaped parts.

To make it easier to carry the writing instrument, the fastener protruding on the upper end of inner shaft can be extended to form a clip for securing the casing of the writing instrument to an external object.

To make it easier to manufacture, the tube forming the inner shaft can be divided into two sections that engage one another at a socket joint.

Furthermore, the outer surface of inner shaft can be configured to appear as stainless steel. To achieve this goal at a low cost, the inner shaft can be made of a plastic electroplate. If desired, characters or patterns can be printed on the surface of the inner shaft. Additionally, the surface of inner shaft can be treated with post-treatments, such as brightening, sub-brightening, and so on.

Compared with existing technology, writing instruments formed of casings according to the present invention have many advantages. For example, in an embodiment where the outer shaft has a raised hard part and a raised soft part formed by dual injection molding and the hard part is made of a transparent material, the inner shaft is revealed on the surface of the hard part of the outer shaft. This advantage is enhanced when the inner shaft has a surface effect. Casings for writing instruments formed according to the present invention are not only configured with a better, more comfortable area for holding the writing instrument, but provide also a unique and pleasant appearance. In addition, the grade of the product can be elevated at a low cost.

Techniques disclosed herein can be used for manufacturing casings for various writing tools, including but not limited to pens, such as ball point pens, felt tip pens, highlighters, etc., and pencils, such as mechanical pencils.

In another aspect, the present application describes a method of manufacturing a casing for a writing instrument, comprising:
  forming an outer shaft using dual injection molding, wherein one step of the injection molding forms a hard part of the outer shaft, and another step of the injection molding forms a soft part of the outer shaft, wherein the soft part includes one or more openings on the outer surface of the outer shaft that receive protrusions of the hard part at corresponding positions on the outer shaft;
  forming an inner shaft for insertion inside the outer shaft, wherein the inner shaft is comprised of an upper section and a lower section that are injection molded separately and then joined, and wherein forming the inner shaft further comprises forming a fastener that protrudes on the upper end of the inner shaft and engages an upper end of the outer shaft; and
  forming a nib that engages the lower end of the inner shaft to help secure the inner shaft within the outer shaft.

In one embodiment, the foregoing method may further comprise extending the fastener from the upper end of the inner shaft to form a clip for securing the casing of the writing instrument to an external object. The method may also further comprise forming the protrusions of the hard part to include an oblique loop-shaped part that divides the hard part into a upper section and a lower section. The tipper section may include one or more strip-shaped hard parts and the lower section may include one or more arc-shaped hard parts protruding from the surface of the outer shaft. The strip-shaped parts may be distributed symmetrically on the upper section, and the arc-shaped parts may be laterally extended on the lower section from one side of the outer shaft to another side of the outer shaft.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The following is a detailed description of an embodiment of a writing instrument formed using a casing that is manufactured according to the present invention. The casing illustrated in FIG. 1-5 is comprised of three parts: an outer shaft 1, an inner shaft 2, and a nib 3.

Figures 1, 1A, 1B, 1C:
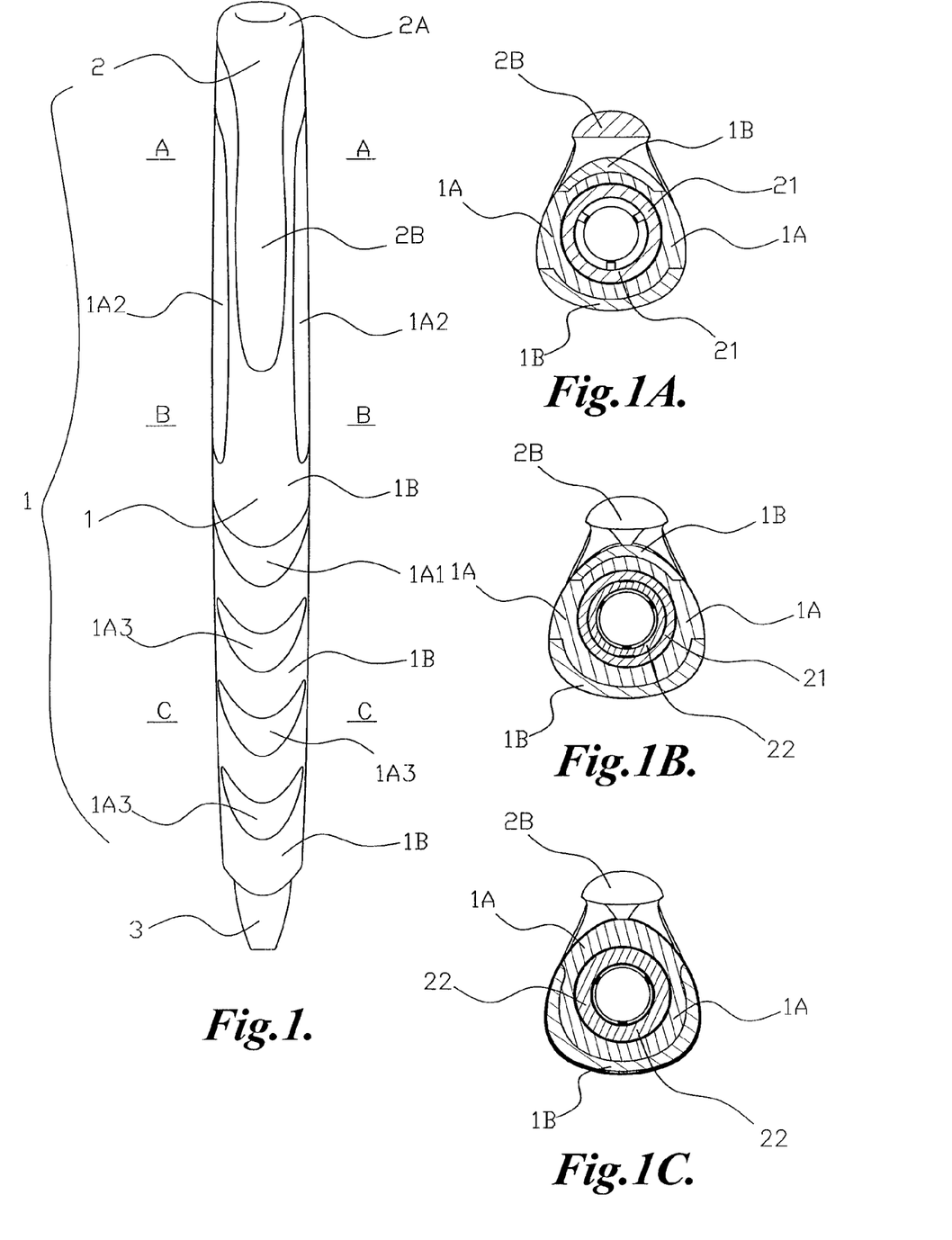
FIG. 1 illustrates a front elevational view of one embodiment of a casing for a writing instrument manufactured in accordance with the present invention.
FIGS. 1A, 1B, and 1C illustrate, in order, the cross sections A-A, B-B, C-C of the casing shown in FIG. 1.
Figure 2:
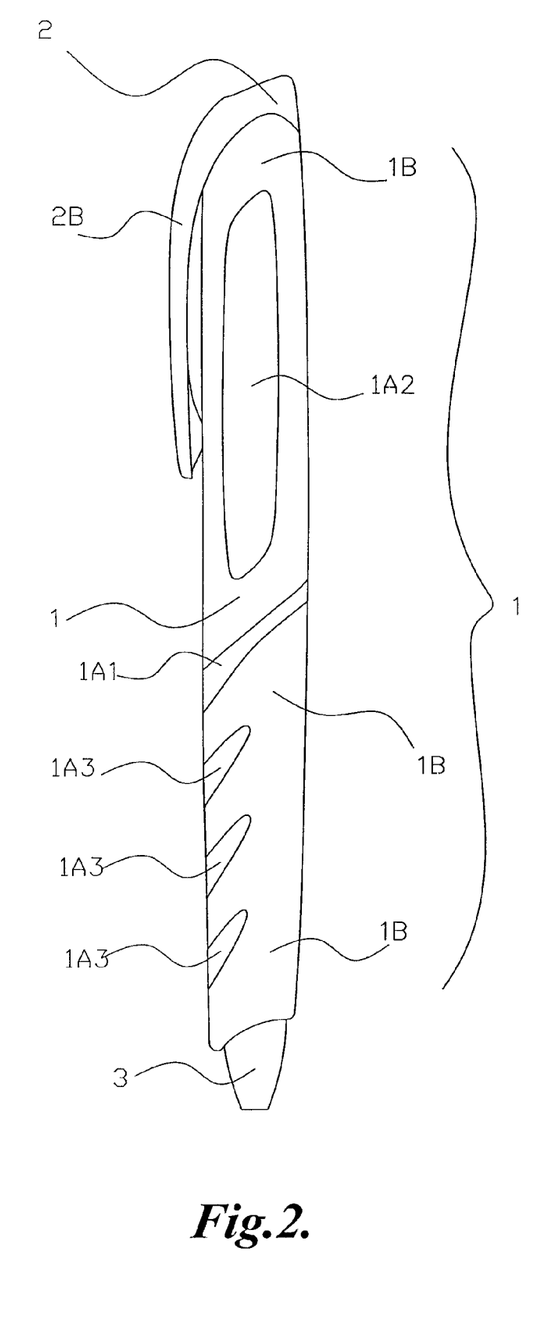
FIG. 2 illustrates a right side elevational view of the casing shown in FIG. 1.
Figure 3:
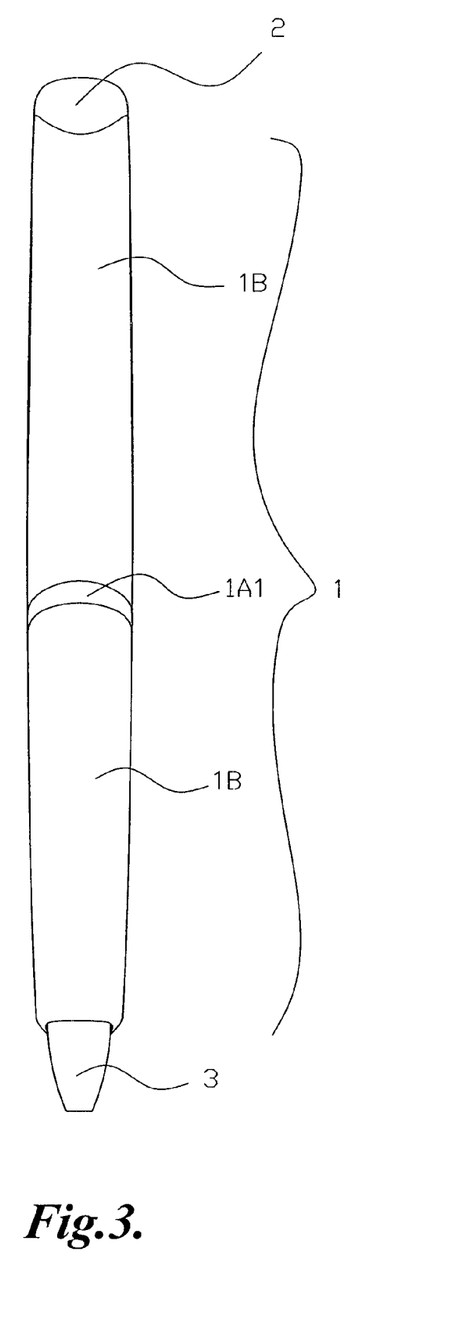
FIG. 3 illustrates a rear elevational view of the casing shown in FIG. 1.
Figure 4:
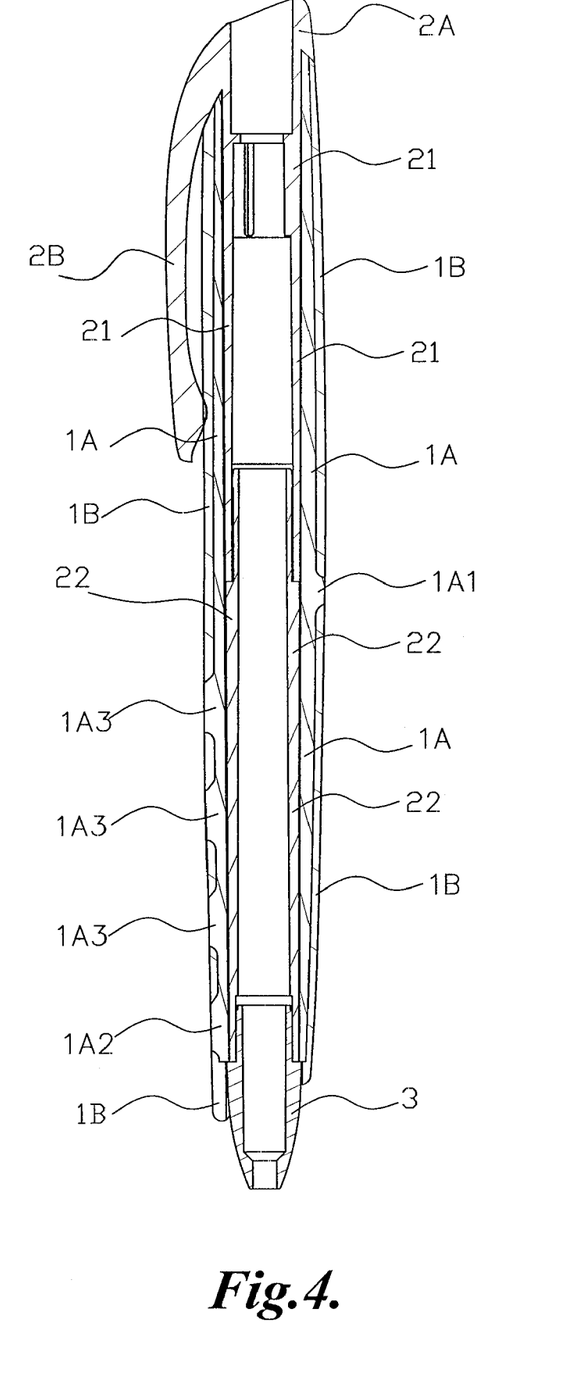
FIG. 4 illustrates a vertical section view of the casing shown in FIG. 1.

The outer shaft 1 may be formed using dual injection molding. In the illustrated embodiment, the molding process produces a tube, the cross section of which may be roughly shaped as a triangle, as shown in FIGS. 1A, 1B and 1C. The sides of the triangle are shaped with an arc that transitions between each angle of the triangle.

Figure 5:
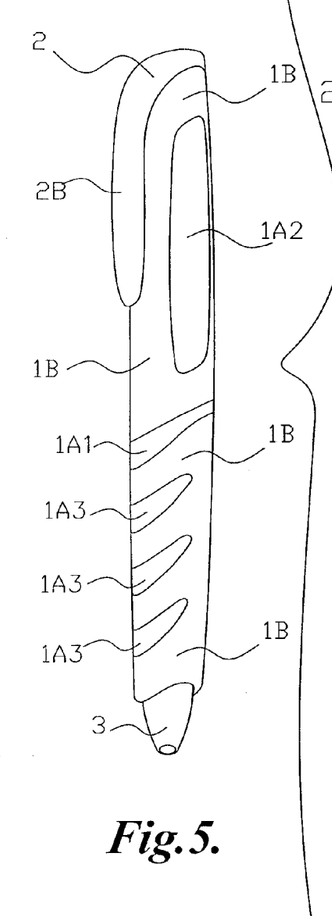
FIG. 5 illustrates a perspective view of the casing shown in FIG. 1.
Figure 5A:
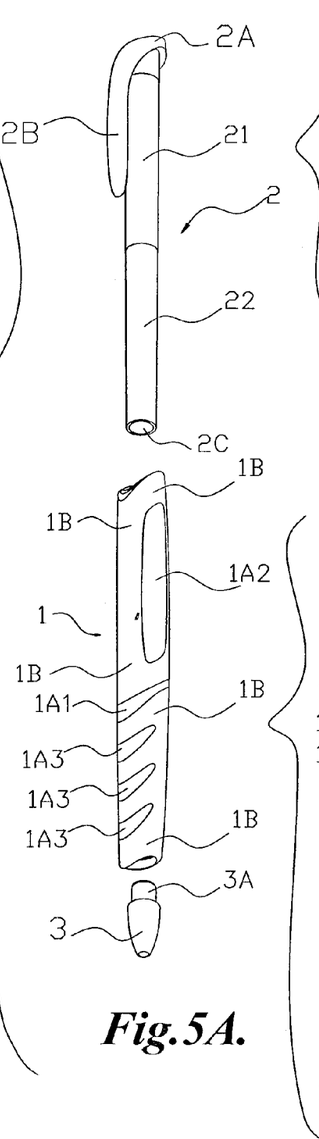
FIG. 5A provides an exploded view of an inner shaft, an outer shaft, and a nib that form the casing shown in FIG. 5.
Figure 5B:
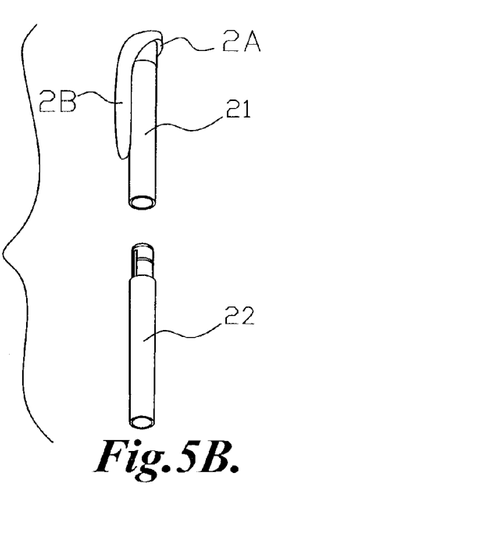
FIG. 5B provides an exploded view of the inner shaft shown in FIG. 5A.
Figure 5C:
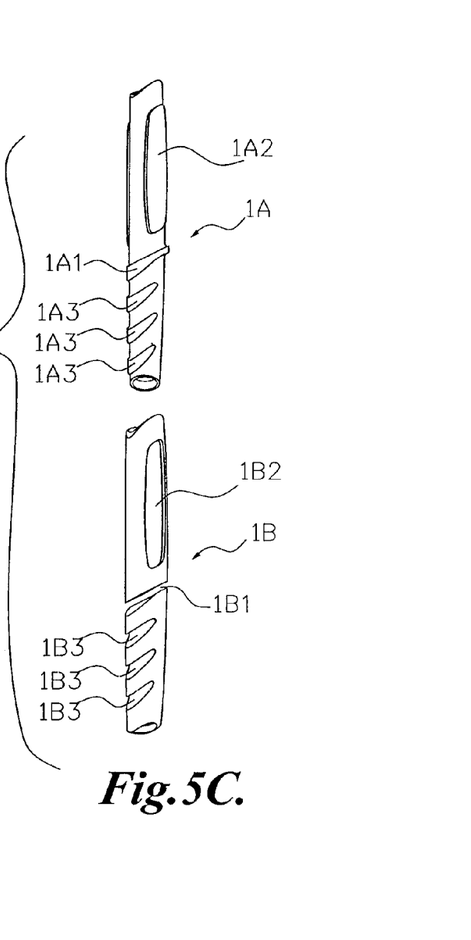
FIG. 5C provides an exploded view of the outer shaft shown in FIG. 5A, comprising hard and soft parts of the casing.
Figure 6:
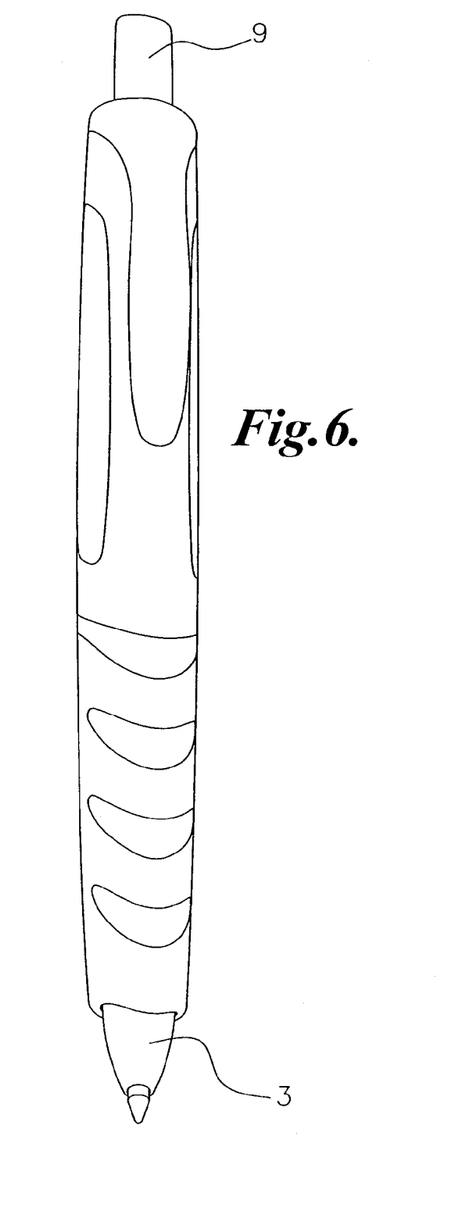
FIG. 6 illustrates a perspective view of a writing instrument formed using the casing shown in FIG. 1, wherein the writing instrument is a push-type ball point pen.

As shown in FIG. 5, and more particularly in FIG. 5C, the outer shaft 1 includes a hard part 1A and a soft part 1B. In one embodiment, the materials used to form the hard part 1A and the soft part 1B may be transparent ebonite resin MBS and maltha resin TPR respectively. The outer shaft 1 is shaped twice by injection molding in a dual injection molding machine.

In one embodiment, the hard part 1A is molded first. The shape of the gagger of the mold is the shape of the inner surface of the hard part 1A. The shape of the cavity of the mold is the shape of the outer surface of the hard part 1A. The hard part 1A thus formed in the first injection molding process may be called a half-product. Its shape, as shown in the upper part of FIG. 5C, is a plastic tube, which may be transparent. The hard part 1A, in this embodiment, has a raised oblique loop-shaped part 1A1 disposed approximately at the middle of the outer shaft 1. The oblique loop-shaped part 1A1 divides the outer shaft 1 into an upper section and a lower section. On the upper section, there are one or more raised strip-shaped parts 1A2. The strip-shaped parts 1A2 may be distributed symmetrically. The lower section may include one or more raised arc-shaped parts 1A3. In the embodiment shown in FIG. 5C, three arc-shaped parts 1A3 are formed on the hard part 1A of the outer shaft 1.

In the above embodiment, the soft part 1B of the outer shaft 1 is molded second. This time, the hard part 1A formed in the first injection molding process acts as the gagger of the mold, and the shape of the cavity of the mold is the shape of the outer surface of the soft part 1B. The soft part 1B may also be called a half product; that is, the two half products (hard part 1A and soft part 1B) are molded to form the whole product. The shape of the soft part 1B formed in the second injection molding is shown in the lower part of FIG. 5C. Corresponding openings 1B1, 1B2 and 1B3 are configured to receive and respectively surround the raised oblique loop-shaped part 1A1, the strip-shaped parts 1A2 and the arc-shaped parts 1A3 that were formed on the hard part 1A. These openings allow the oblique loop-shaped part 1A1, the strip-shaped part 1A2 and the arc-shaped parts 1A3 to protrude outward to the surface of the casing and help secure the later molded soft part 1B to the first molded hard part 1A. A dual injection molded outer shaft 1 for a writing instrument is thus obtained. In an alternative embodiment, the hard part 1A and the soft part 1B of the outer shaft 1 may be injection molded simultaneously. In addition to having a different hardness, the hard part 1A and the soft part 1B may have a different color, if desired.

The inner shaft 2 is formed of a thin-wall tube having an upper end and a lower end. The inner shaft 2 is configured to be inserted inside the outer shaft 1 and includes a fastener 2A protruding on its upper end, as shown in FIG. 5A. The fastener 2A engages an upper end of the outer shaft 1. To make it easier to carry and more pleasant to eye, the fastener 2A may be configured to further extend from the inner shaft 2 to form a clip 2B that helps secure the casing to an external object. In circumstances where the process of injection molding the long, thin-wall tube forming the inner shaft 2 is likely to produce defects, such as deviation and shrink, a corrective measure may be taken. As shown in FIG. 5B, the inner shaft 2 may be divided into an tipper section 21 and a lower section 22 that are injection molded separately. The two sections 21 and 22 may be configured to engage one another other, preferably using a socket joint. As a result, the inner shaft 2 shown in the upper part of FIG. 5A is formed.

In a further embodiment in which the grade of the writing instrument is improved, the outer surface of the inner shaft may be configured to appear as stainless steel. To achieve this goal at a low cost, a plastic electroplate can be used, i.e. an injection molded plastic inner shaft 2 is treated with a surface electroplate, e.g. electroplating chromium, nickel, silver, and so on.

In addition to the functions known to a person skilled in the art, the nib 3 in the present application plays a further role in connecting and fixing itself with the outer shaft 1 and the inner shaft 2. On the upper end 3A of the nib 3, there is an outer screw thread, and on the lower end 2C of the lower section 22 of the inner shaft 2, there is a corresponding inner screw thread. The outer screw thread of the nib 3 is configured to engage the inner screw thread of the inner shaft 2 and thus help secure the inner shaft 2 within the outer shaft 1.

Figure 7:
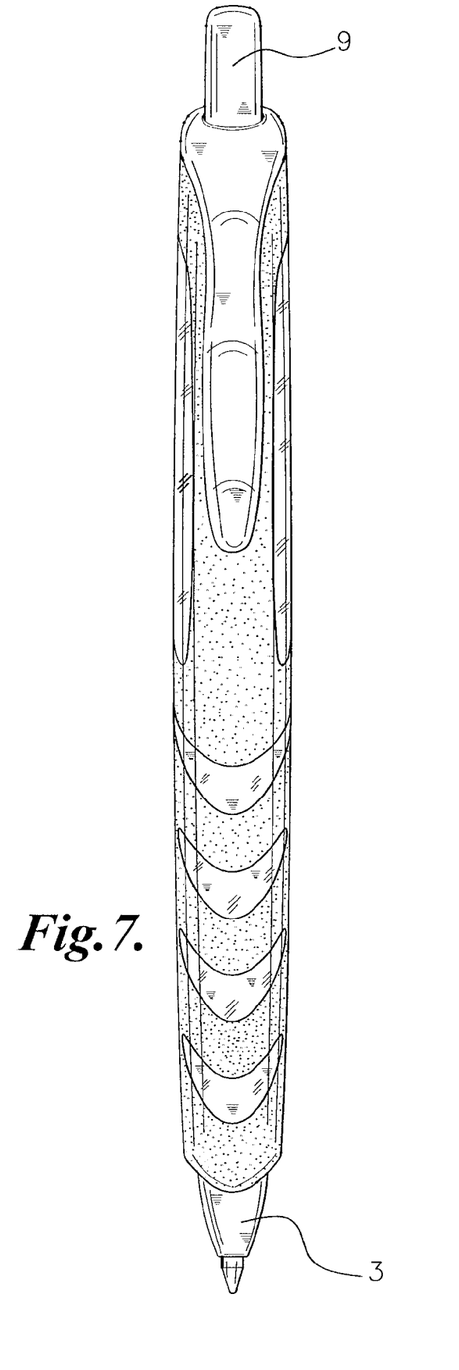
FIG. 7 illustrates a front elevational view of the pen shown in FIG. 6, with shade lines and stippling to indicate surface contours and texture.
Figure 8:
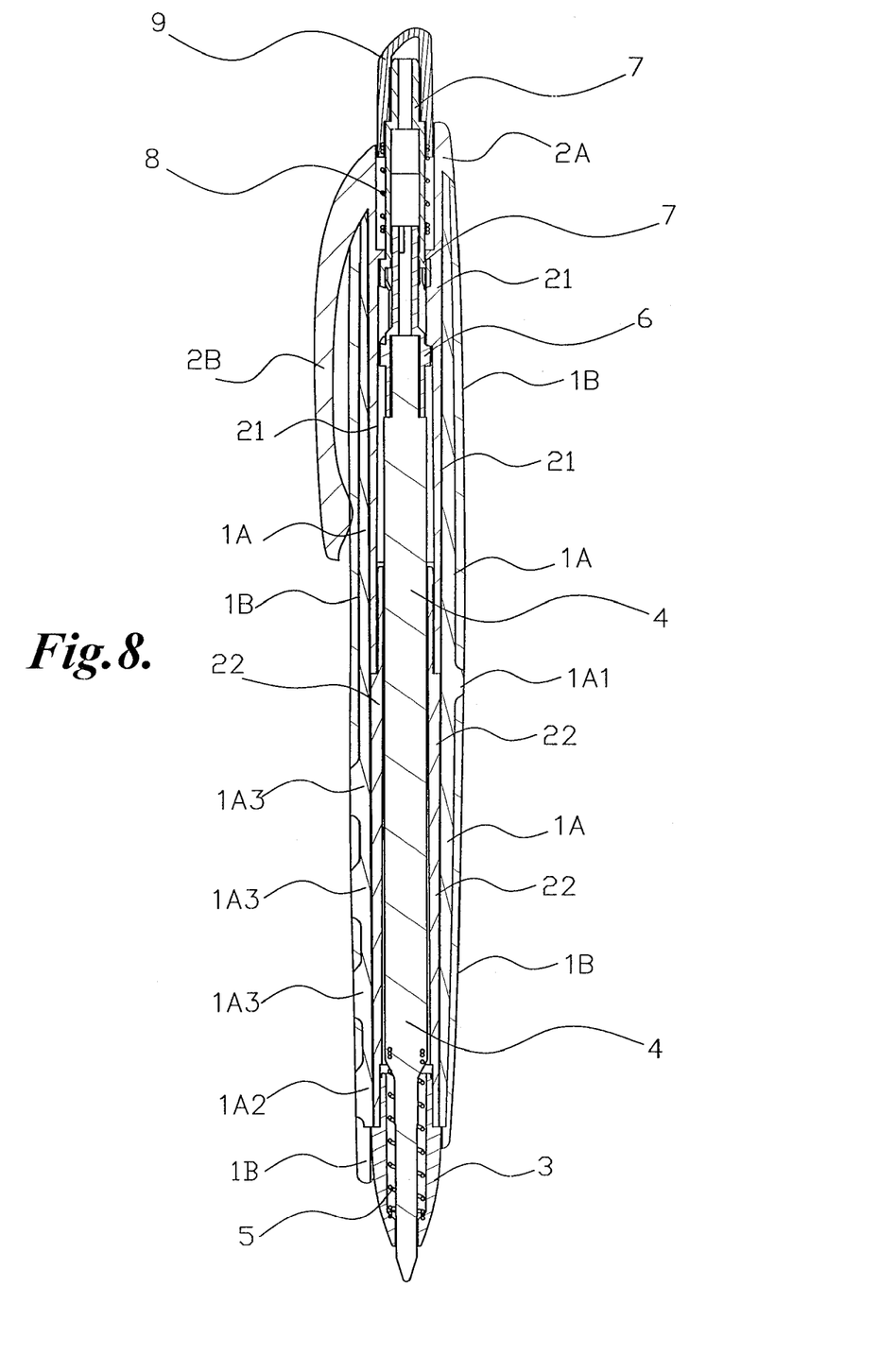
FIG. 8 illustrates a vertical section view of the pen shown in FIG. 6.
Figure 9:
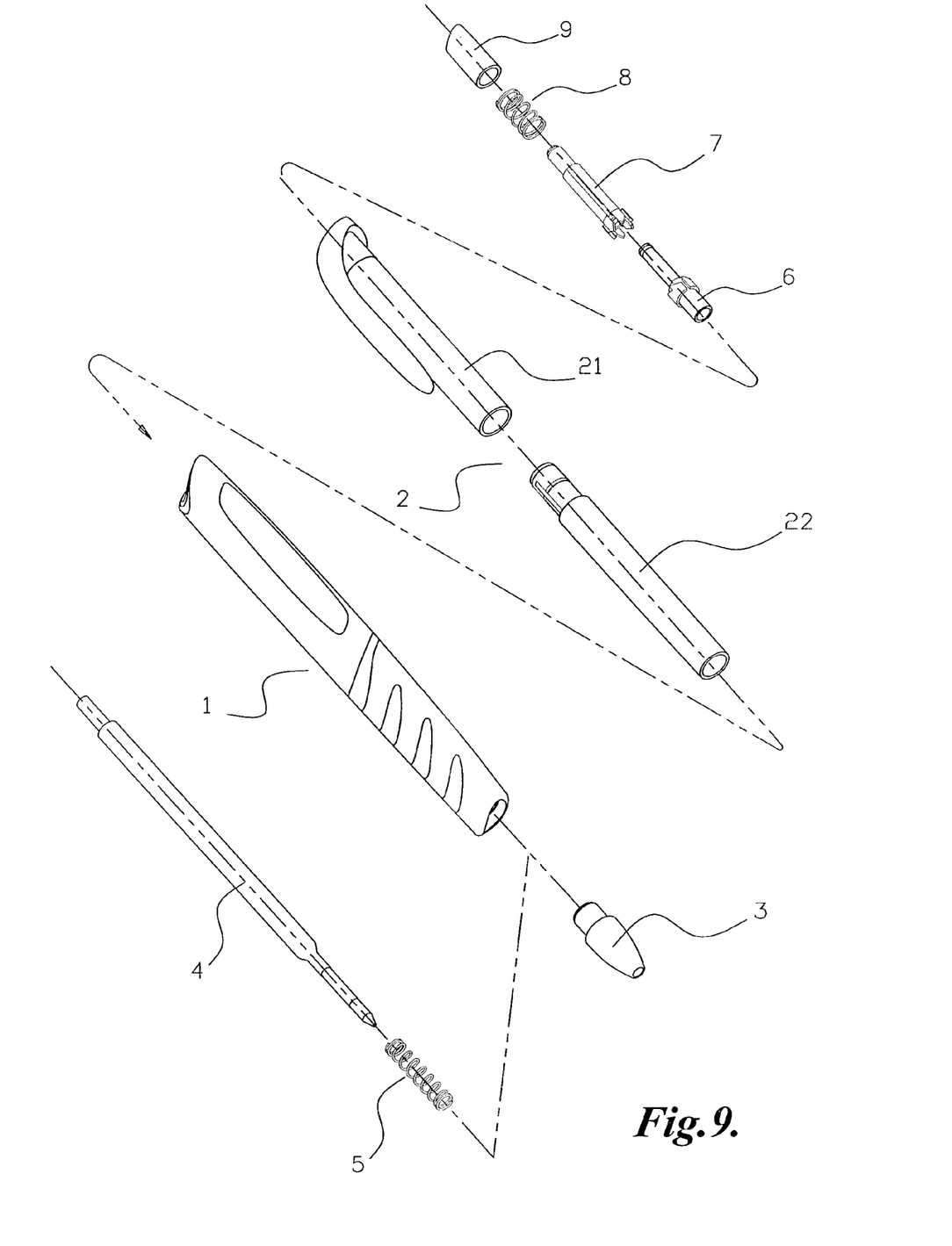
FIG. 9 shows an exploded perspective view of components forming the pen shown in FIG. 6.

FIGS. 6-9 illustrate a push-type ball point pen made with a casing that has been manufactured in accordance with the present application. Common parts used in the pen-making industry, such as a refill cartridge 4, refill spring 5, roller 6, pushing wheel 7, pushing spring 8 and pushing head 9, according to the views shown in FIGS. 8 and 9, are installed inside the casing to produce the ball point pen. The pen therewith obtains the advantages of the present invention. An outward appearance of a pen of this type is shown in FIG. 7.

The invention is not necessarily limited to the representative figures. For example, variations below can be freely substituted.

As to transparent hard materials, in addition to transparent MBS, transparent ABS or any other suitable resins can be used, provided they are hard enough to maintain an appropriate rigidity for a casing suitable for a writing instrument. Similarly, in addition to TPR, any other suitable materials can be used for the soft part 1B, provided their hardness is lower than that of the hard materials used for the hard part 1A.

The cross section of the outer shaft 1 is not limited to a triangle shape. Other shapes can also be selected, such as round, rough square, hexagon, and so on.

As to the distribution of the raised hard and soft parts on the surface of the outer shaft 1, the hard part 1A can be adopted as the basic part that surrounds the soft part 1B.

The combination of the shape and position of the inner shaft surface can be changed freely. Moreover, the materials used to manufacture the inner shaft 2 can be metal or partly metal. Alternatively, the inner shaft 2 can adopt an integrated scheme in the invention. If desired, the casing may not include clip 2B protruding from the inner shaft 2.

The color or the surface pattern of the inner shaft 2 can be any desirable color or pattern. Casings constructed according to the present invention are not limited to making push-type ball point pens. As noted earlier, the casing described and claimed herein may be used with other types of pens, pencils, and writing tools. Casings constructed according to the present invention can also be used in making writing tools having a cap, wherein the casing is inserted into and removed from the cap.

While illustrative embodiments have been illustrated and described, it will be appreciated that various changes can be made therein without departing from the spirit and scope of the invention.

We claim:

1. A casing for a writing instrument, comprising:
   an outer shaft formed using dual injection molding, wherein an outer surface of the outer shaft includes a raised hard part formed of a hard material and a raised soft part formed of a material that is softer than the hard material;
   an inner shaft formed of a thin-wall tube having an upper end and a lower end, the inner shaft being configured for insertion inside the outer shaft and including a fastener protruding from the upper end to form a clip that secures the casing to an external object, the clip having an upper part comprising an edge curved toward the thin-wall tube so as to engage the upper end of the outer shaft; and
   a nib configured to engage the lower end of the inner shaft.

2. The casing of claim 1, wherein the outer shaft has a cross section shaped as a triangle with a respective arc that transitions between each angle of the triangle.

3. The casing of claim 1, wherein the raised soft part is configured to improve a user's grip of the writing instrument and the raised hard part is surrounded by the soft part.

4. The casing of claim 1, wherein the raised hard part is configured to improve a user's grip of the writing instrument and the raised soft part is surrounded by the hard part.

5. The casing of claim 1, wherein one of the raised hard or soft parts includes an oblique loop-shaped part that divides the outer shaft into a upper section and a lower section.

6. The casing of claim 5, wherein the upper section of the outer shaft includes one or more strip-shaped hard or soft parts disposed on the surface of the raised hard part of the outer shaft.

7. The casing of claim 6, wherein the strip-shaped parts are distributed symmetrically on the upper section of the outer shaft.

8. The casing of claim 6, wherein the lower section of outer shaft includes one or more arc-shaped hard or soft parts disposed on the surface of the raised hard part of the outer shaft.

9. The casing of claim 8, wherein the arc-shaped parts are configured to extend laterally from a side of the outer shaft to an opposing side of the outer shaft.

10. The casing of claim 8, wherein the one or more strip-shaped parts and the one or more arc-shaped parts are disposed on the raised hard part such that they protrude outward.

11. The casing of claim 8, wherein the raised soft part comprises openings corresponding to the one or more strip-shaped parts and the one or more arc-shaped hard parts of the raised hard part, wherein the openings are configured to receive and respectively surround the one or more strip-shaped parts and the one or more arc-shaped hard parts of the raised hard part so as to secure the raised soft part to the raised hard part.

12. The casing of claim 1, wherein the fastener is further configured to protrude from the upper end of the inner shaft to form a clip for securing the casing of the writing instrument to an external object.

13. The casing of claim 1, wherein the tube forming the inner shaft is comprised of two sections that engage one another at a socket joint.

14. The casing of claim 1, wherein an outer surface of the inner shaft is configured to appear as stainless steel.

15. The casing of claim 14, wherein the inner shaft is made of a plastic electroplate.

16. The casing of claim 1, wherein the material forming the raised hard part is a transparent material.

17. The casing of claim 1, wherein the raised hard part of the outer shaft is molded prior to the raised soft part and acts as a gagger of a mold for forming the raised soft part, wherein corresponding openings in the soft part are configured to receive the raised hard part to allow the raised hard part to protrude outward to the surface of the casing and help secure the later molded soft part to the hard part.

* * * * *

UNITED STATES PATENT AND TRADEMARK OFFICE
CERTIFICATE OF CORRECTION

| | | | |
|---|---|---|---|
| PATENT NO. | : 7,883,754 B2 | | Page 1 of 1 |
| APPLICATION NO. | : 11/535465 | | |
| DATED | : February 8, 2011 | | |
| INVENTOR(S) | : Qiu et al. | | |

It is certified that error appears in the above-identified patent and that said Letters Patent is hereby corrected as shown below:

| COLUMN | LINE | ERROR |
|---|---|---|
| 6 (Claim 5, | 15 line 3) | "into a upper section" should read --into an upper section-- |
| 6 (Claim 8, | 23 line 1) | "lower section of outer" should read --lower section of the outer-- |

Signed and Sealed this
Seventh Day of June, 2011

David J. Kappos
*Director of the United States Patent and Trademark Office*